UNITED STATES PATENT OFFICE.

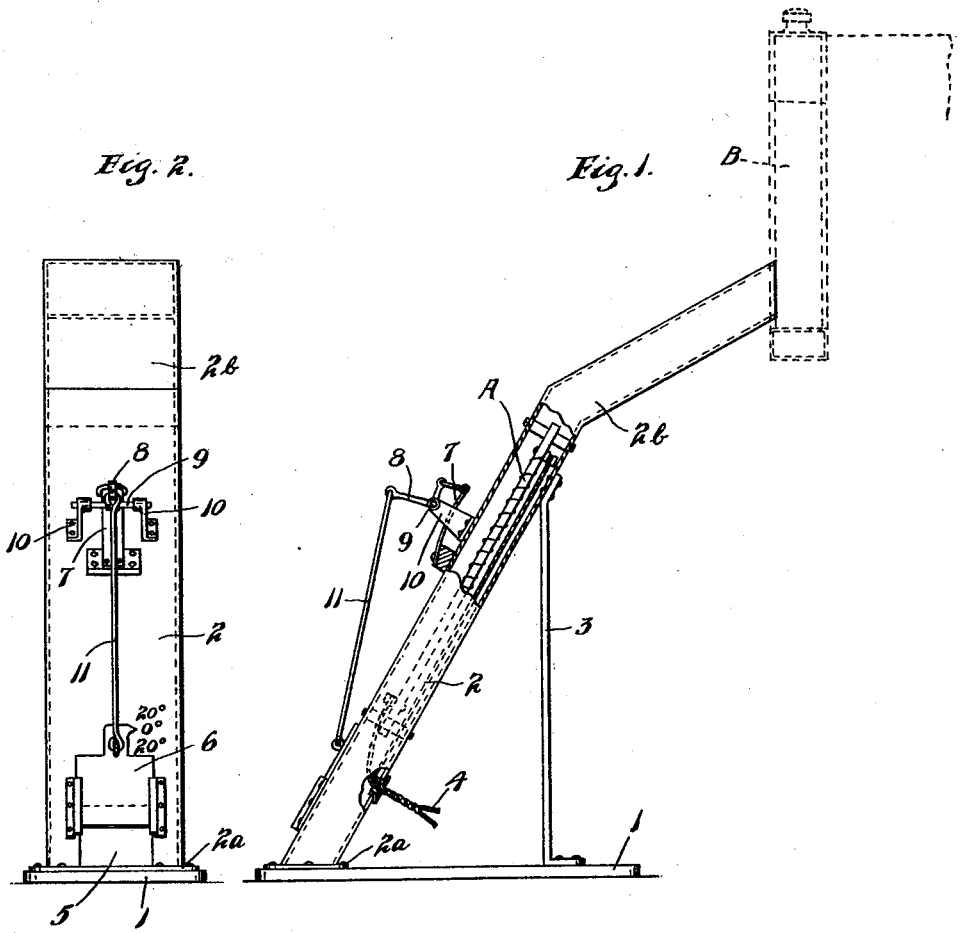

HIRAM F. BROWN, OF MINNEAPOLIS, MINNESOTA, ASSIGNOR OF ONE-THIRD TO L. E. BROWN AND ONE-THIRD TO PETER B. HANSEN, BOTH OF MINNEAPOLIS, MINNESOTA.

AUTOMOBILE ELECTRIC HOOD HEATER.

1,407,725.  Specification of Letters Patent.  Patented Feb. 28, 1922.

Application filed April 25, 1921. Serial No. 464,167.

*To all whom it may concern:*

Be it known that I, HIRAM F. BROWN, a citizen of the United States, residing at Minneapolis, in the county of Hennepin and State of Minnesota, have invented certain new and useful Improvements in Automobile Electric Hood Heaters; and I do hereby declare the following to be a full, clear, and exact description of the invention, such as will enable others skilled in the art to which it appertains to make and use the same.

This invention relates to a heating device, and particularly, to such a device designed to be used in unheated garages to heat the radiator and adjacent parts of an automobile. As is well known, it is most important to maintain a suitable temperature of the radiator of an automobile and the adjacent engine parts.

It is an object of this invention, therefore, to provide a heater adapted to rest upon the floor and to have a conduit leading to and disposed adjacent to the automobile radiator and hood so that the heated air from the heater can pass through the radiator and back through said hood.

In order that the heater may be effective to properly heat the automobile in all stages or degrees of the weather it is also an object of the invention to so arrange the heater that it will always deliver a substantially constant amount of air and at substantially the same temperature, and while this result could be obtained by manual adjustment of the device, automatic means are provided for securing said result.

These and other objects of the invention will be clear from the following description made in connection with the accompanying drawings in which like reference characters refer to the same parts throughout the different views, and in which, Fig. 1 is a view in side elevation of the heater showing the same disposed in relation to the hood of an automobile, certain parts of the heater being shown in section; and Fig. 2 is a view in end elevation of the heater as seen from the left of Fig. 1.

Referring to the drawings, the device is shown as supported upon a suitable base 1. At one end of this base member an upwardly extending inclined conduit 2 shown as of general rectangular section is secured by a flange $2^a$ suitably bolted or otherwise fastened to the said base. The conduit 2 has a portion $2^b$ at its upper end extending at a greater angle to the vertical, which portion has an open end lying in a substantially vertical plane and which is adapted to be placed against the front end of the automobile radiator. The said conduit is shown as supported by a strut or base member 3 secured thereto and to the base member 1. An electric heating device designated generally as A is provided in the lower section of the conduit 2 and conductors 4 are shown as leading to said heating device, which conductors will preferably be connected to a suitable switch, not shown, which may, in turn, be associated with a rheostat by means of which the heating capacity of the heater may be regulated. Such heating devices are now commercially well known and the heating device, per se, forms no part of the present invention. While an electrical heating device is illustrated, it is, of course, within the province of the invention to use any equivalent heater.

The device is designed to deliver at its upper end a constant supply of air which is maintained at substantially the same temperature. While the heater may be made in various sizes, one commercial size which has proven very successful is designed to deliver about three cubic feet of air per second at a temperature of substantially 150 degrees. The conduit is provided with an opening 5 at its lower front end and a slide or valve 6 is disposed in suitable guides at the sides of the openings to be moved therein to vary the size of said opening. The air enters the conduit through the opening 5 and will, of course, be expanded as it is heated and rise through the conduit to the delivery end. The colder the air is, the more expansion will take place to raise the same to the desired delivery temperature. In order therefore to have a constant quantity of air delivered the quantity of air taken in through the opening 5 must be varied according to the temperature of the exterior air. While the supply of air taken in might be manually regulated by noting the temperature and adjusting the valve at certain intervals, automatic means are provided for making this adjustment. Such means comprise a thermostatic plate 7 rigidly secured at one end to a block or base riveted or otherwise secured to the upper side of the conduit 2. A bell crank lever 8 is secured to a short shaft 9 supported in spaced bearings 10 also secured to the upper side of the conduit and the long arm of the bell crank lever is connected by a link 11 to the slide 6. The short arm of the bell crank lever is in turn connected by a short link to the end of the thermostatic plate 7. The plate 7 is constructed with its opposite surfaces of different materials, the co-efficient of expansion of which is different so that the plate will be distorted or curved in different directions as the temperature rises or falls. The movement of the plate will be communicated to the bell crank lever 8 and multiplied thereby and thus transmitted to the slide 6. With this arrangement, the slide 6 will be controlled so that the amount of air taken in through the opening 5 will be varied with the temperature so that the above stated result, i. e., to secure the delivery of substantially constant volume of air at substantially constant temperature at the upper end of the conduit, will be attained. The device is shown in Fig. 1 with the upper end disposed in proper relation to the hood B of the automobile.

The device has been found in actual practice to have great utility and to be very efficient and such efficiency is largely due to the above described regulation. If desired, the heating capacity of the heating element A may be varied but the device has been found to take care of great variations in temperature without such regulation of the heat capacity.

It will, of course, be understood that various changes may be made in the form, details and arrangement of the device without departing from the scope of applicant's invention, which, generally stated, consists in the matter shown and described and set forth in the appended claims.

What is claimed is:

1. An automobile hood heater having in combination, a base portion adapted to rest upon the floor, an upwardly extending conduit the upper end of which is adapted to be disposed parallel to and in close proximity to the radiator of an automobile, a heating device in said conduit said conduit having an opening adjacent its lower end for the inlet of air, and means for adjusting said opening to maintain a constant delivery of air at the upper end of substantially the same temperature.

2. A device of the class described having in combination a conduit having an open upper end adapted to be disposed in close proximity to the radiator of an automobile, said conduit having an air inlet opening at its lower end, a heating device in said conduit, and means for adjusting the size of said opening to maintain a delivery of a constant quantity of air at the upper end of the conduit of substantially the same temperature.

3. An automobile hood heater having in combination a base portion, a conduit secured thereto and extended upwardly therefrom and formed with an air inlet opening adjacent its lower end, the upper end of said conduit being open and being arranged to be disposed in close proximity to the radiator of an automobile, an adjustable member adapted to vary the size of said opening in the lower end of the conduit, and means for moving said member to vary said opening, whereby a constant quantity of air is delivered at the upper end of the conduit, which air is of substantially the same temperature.

4. A device of the class described comprising an upwardly extending conduit supported upon a base portion and having an air inlet opening adjacent its lower end, and having its upper end arranged to be disposed in close proximity to an automobile radiator, a movable member arranged to vary the size of the opening in the lower end of the conduit and thermostatically controlled means for moving said member to vary the size of said opening whereby a constant quantity of air will be delivered at the upper end of the conduit, which air is of substantially the same temperature.

5. A device of the class described having in combination an upwardly extended conduit secured and supported on a base portion having an air inlet opening adjacent its lower end, and an air discharge outlet at its upper end, an electric heating device in said conduit, a movable member adapted to vary the size of said opening in the lower end of the conduit, and a thermostatically controlled lever for moving said member to vary the size of said opening.

In testimony whereof I affix my signature.

HIRAM F. BROWN.